I. SNOW.

FEELER MECHANISM FOR LOOMS.

Reissued June 6, 1922. APPLICATION FILED APR. 13, 1922. 15,375.

2 SHEETS—SHEET 1.

Inventor:
Isaac Snow
by Robt. P. Harris,
Attorney

I. SNOW.

FEELER MECHANISM FOR LOOMS.

Reissued June 6, 1922. 15,375.

APPLICATION FILED APR. 13, 1922.

2 SHEETS—SHEET 2.

Inventor:
Isaac Snow.
by Robt. P. Harris.
Attorney

UNITED STATES PATENT OFFICE.

ISAAC SNOW, OF LAWRENCE, MASSACHUSETTS, ASSIGNOR TO DRAPER CORPORATION, OF HOPEDALE, MASSACHUSETTS, A CORPORATION OF MAINE.

FEELER MECHANISM FOR LOOMS.

15,375. Specification of Reissued Letters Patent. Reissued June 6, 1922.

Original No. 1,392,805, dated October 4, 1921, Serial No. 379,266, filed May 6, 1920. Application for reissue filed April 13, 1922. Serial No. 553,198.

*To all whom it may concern:*

Be it known that I, ISAAC SNOW, a citizen of the United States, residing at Lawrence, in the county of Essex and State of Massachusetts, have invented an Improvement in Feeler Mechanisms for Looms, of which the following description, in connection with the accompanying drawings, is a specification, like characters on the drawings representing like parts.

This invention relates to feeler mechanisms for looms, through the agency of which filling replenishment is effected when the filling in the shuttle becomes substantially exhausted.

A feeler mechanism should be sensitive and responsive to either the presence or substantial absence of filling in the shuttle on a detecting beat. Its failure to respond to substantial exhaustion of filling is liable to cause imperfect cloth to be woven by laying a blank or partial pick; and on the other hand, should it operate to effect replenishment of filling before substantial exhaustion of filling is reached, an undesirable waste of filling is caused by the premature ejection of the filling carrier or bobbin from the shuttle, or while it contains a working supply of filling.

One of the features of the present invention consists of a feeler mechanism wherein the feeler is mounted for movement toward and from the front of the loom and also in a direction longitudinally of the shuttle, and is under the control of a rack which is normally held in position by yielding means such as a spring which tends to impart to the feeler its movement longitudinally of the shuttle on a detecting beat, and is held from effecting such movement when the feeler engages and is held by the filling in the shuttle. In carrying this feature of the invention into effect, the rack is independently mounted and is under the control of a spring whose tension may be readily varied to adjust the sensitive character of the feeler both to the presence and to the substantial absence of filling in the shuttle.

Other important features of the invention, and novel combination of parts will be herein described in addition to the above, and in connection with the accompanying drawings which show one good, practical form of the invention, wherein:—

Figure 1:
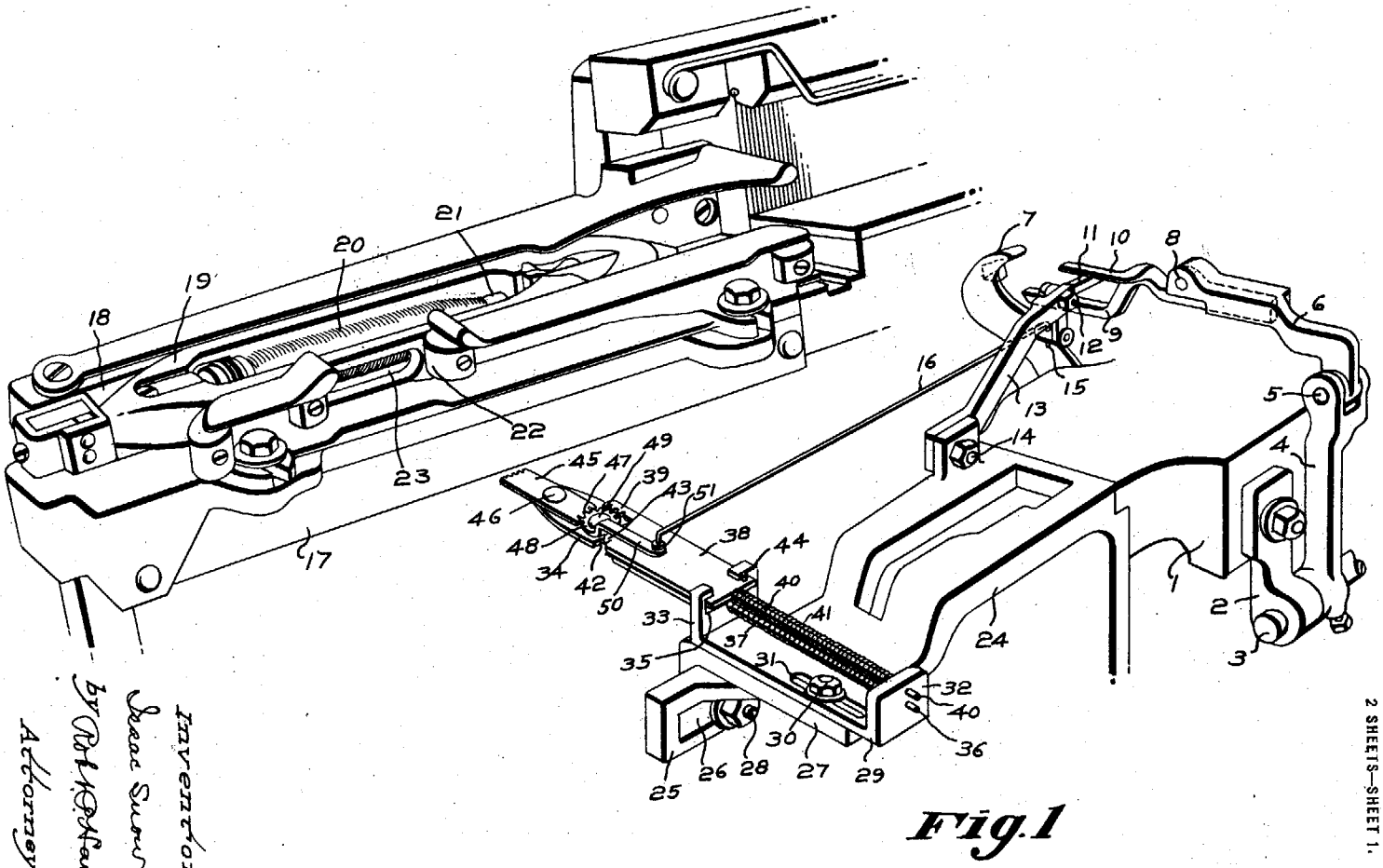
Figure 1 is a perspective view of the feeler side of the loom showing more particularly the feeler mechanism and the associated parts.
Figure 2:
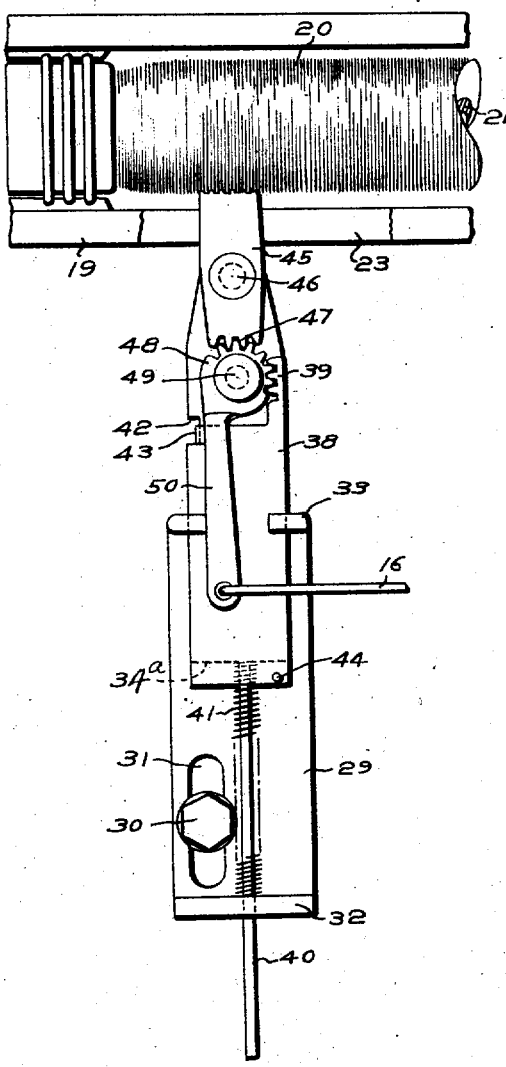
Fig. 2 is a plan view on an enlarged scale, showing the action of the feeler mechanism when a working supply of filling is present in the shuttle on a detecting beat.
Figure 3:
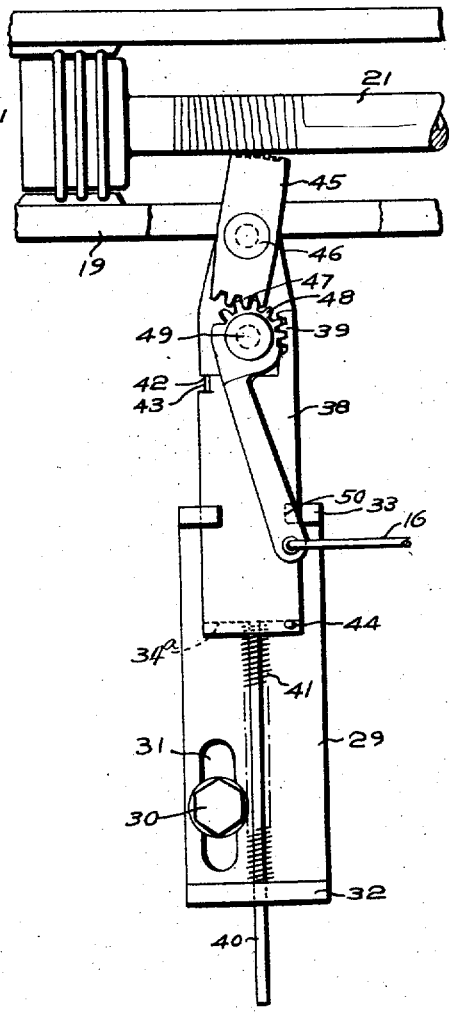
Fig. 3 is a view similar to that of Fig. 2, showing the operation of the feeler mechanism when the filling is substantially exhausted on a detecting beat.

The loom frame 1 has secured thereto the brackets 2, one at each side of the loom, in which is supported the transverse or rock shaft 3 connected at its opposite end from that shown in the drawings, to the replenishing controlling means. This shaft and its connected mechanism is of well known type. Rising from the transverse shaft is the arm 4 to which is pivoted at 5 the latch 6 which is adapted to be moved frontwardly on call for replenishment of filling, by an operating member 7 preferably formed as a part connected to the cam follower or weft hammer, as usual in this class of looms.

In the present instance, the latch 6 has pivotally secured thereto at 8, the operating engaging member or end 9. Extending from the portion 9 of the latch is the finger 10 beneath which extends one arm of the bell crank lever 11 pivoted at 12 to a suitable support rising from the loom frame, and which, in the present instance, comprises the arm 13 secured to the loom frame at 14. The bell crank lever 11 is connected at 15 to a transmitter 16 which is under the control of the feeler mechanism, whereby, upon indication of substantial exhaustion of filling on a detecting beat, the end of the latch 6 is placed in the path of the operating member 7 to cause frontward rocking movement of the transverse or rock shaft 3, which effects a replenishment of filling.

The lay 17 has the usual shuttle-box 18, in which is received the shuttle 19 which carries the filling 20. The filling 20 is wound upon a suitable carrier or bobbin 21 as usual. The front wall of the shuttle-box is slotted at 22, and the adjacent wall of the shuttle when in the detecting box has an opening 23 which registers with the opening 22 in the front wall of the shuttle-box, the construction of parts being such that on a detecting beat, the openings 22 and 23 are relatively positioned to permit the entrance of a feeler to feel for and detect the condition of the filling in the shuttle.

Extending from the loom frame is the shipper stand 24 having a bracket portion 25 slotted at 26 for adjustably supporting a bracket 27. The bracket 27 may be adjustably supported on the arm 25 by a suitable securing bolt 28.

The feeler in the present invention is mounted for movement toward and from the front of the loom and is supported upon a feeler carrier, two general types of such carriers being common in the art. In the present instance, the bracket 27 has adjustably secured thereto the feeler stand 29 by means of a bolt 30 which passes through a slot 31 in the feeler stand.

The feeler stand is provided with a front flange or bearing portion 32 and a rear flange or bearing portion 33 which constitutes suitable guiding means for the feeler carrier and the rack carrier as will more fully appear.

The feeler carrier 34 is, in the present instance of the invention, formed as a flat plate which extends frontwardly through a slot 35 in the rear flange 33 of the feeler stand and has projecting frontwardly therefrom the stem 36 which passes through an opening in the front flange 32. Surrounding the stem 36 is a spring 37, one end of which bears against the shoulder formed by the flattened portion 34[a] of the feeler carrier, and the other end of which bears against the rear surface of the flange 32, the construction being such that under the impulse of the spring 37 the feeler carrier 34 is normally held in its rear or feeling position, and is limited in its rearward movement by a suitable stop, presently to be described.

Mounted on the feeler stand for movement toward and from the front of the loom and independently of the feeler carrier is the rack carrier 38 which may be preferably formed as a flat plate, as indicated, provided with a rearwardly projecting rack portion 39. The rack carrier 38 extends through the bearing 35 of the rear flange 33 and is preferably superimposed upon the feeler carrier 34. Extending forwardly from the plate portion of the rack carrier is the stem 40 which projects through a suitable guide opening in the front flange 32. A spring 41 surrounds the stem 40 and normally holds the rack carrier 38 in its rearward position with permissive movement frontwardly in opposition to the spring 41. From the construction described, it will be noted that the feeler carrier and rack carrier are independently mounted for independent movement toward and from the front of the loom, and that each is under the influence of a separate spring, the tension of which may be varied to suit conditions of use. The feeler carrier has a slotted portion 42 wider than a downturned lug portion 43 extending from the rack carrier 38, the construction being such that the feeler carrier and rack carrier may have limited relative movement toward and from the front of the loom. Extending through the rack carrier is a stop pin 44 which, when the rack carrier is in its rearward position as indicated in Fig. 1, rests against the rear flange 33. Thus, the rearward position of the rack carrier is defined by the stop 44 and the rearward position of the feeler carrier 34 is defined by the lug 43 on the rack carrier extending into the slot 42 of the feeler carrier.

Mounted upon the feeler carrier for movement therewith, and also in a direction longitudinally of the shuttle, is the feeler, the rear end portion of which is provided with filling engaging teeth, or a roughened surface for engaging the filling on a detecting beat. In the present instance the feeler 45 is pivotally mounted at 46 on the feeler carrier and has one or more teeth 47 which are engaged with the teeth of the gear or toothed rotative member 48 pivotally mounted at 49 on the feeler carrier. The teeth of the gear 48 also engage the rack 39, the construction being such that on frontward movement of the feeler under frontward pressure of a surface within the shuttle on a detecting beat, the tendency of the rack is to rotate the gear 48 and move the feeler in a direction longitudinally of the shuttle, such tendency being responsive to the spring 41 which controls the rack carrier.

When a working supply of filling is present in the shuttle on a detecting beat, the toothed rear end portion of the feeler 45 engages and sinks into the filling which holds the feeler from movement longitudinally of the shuttle as the lay beats up. Under these conditions, the spring 41 of the rack member yields frontwardly without effecting turning movement of the gear 48 which is held from such turning movement by the action of the filling upon the feeler. When, however, the filling is substantially exhausted on a detecting beat, the feeler 45 will no longer be held from movement longitudinally of the shuttle as the lay beats up, and the spring 41 will assert its force through the rack 39 to effect such movement as the feeler moves frontwardly. When the feeler is moved in a direction longitudinally of the shuttle on a detecting beat, as described, it indicates substantial exhaustion of the filling, and the transmitter 16 is thereupon actuated to effect replenishment of filling. In the present instance of the invention, the gear 48 has extending therefrom an arm 50 which is pivotally connected at 51 to the transmitter, the construction being such that when the gear is rotated by the rack, under conditions of substantial exhaustion of filling on a detecting beat, the arm 50 will be swung to place the end of the latch 6 in the path of the operating member 7, to thereby effect replenishment of filling.

The sensitiveness and responsiveness of the feeler to the presence or absence of filling in the shuttle is, of course, dependent upon the tension of the spring 41 which may be conveniently changed by a suitable means as, for instance, by changing the spring so that the feeler will respond to either condition to prevent replenishment of filling when a working supply is present in the shuttle on a detecting beat, and to effect replenishment of filling when the filling is substantially exhausted.

What is claimed is:—

1. In a feeler mechanism for looms, the combination of a feeler carrier mounted for movement toward and from the front of the loom, a feeler mounted on the carrier for movement in a direction longitudinally of the shuttle and held from such movement by engagement with the filling on a detecting beat until substantial exhaustion thereof, a gear having a tooth engagement with the feeler, a rack engaged with the gear, a spring acting upon the rack and tending to turn the gear and move the feeler longitudinally of the shutttle under the frontward pressure upon the feeler on a detecting beat, and means for effecting replenishment of filling when the feeler is moved longitudinally of the shuttle.

2. In a feeler mechanism for looms, the combination of a feeler carrier mounted for movement toward and from the front of the loom, a feeler pivotally mounted upon the carrier to swing in a direction longitudinally of the shuttle and having a toothed portion, a gear mounted on the feeler carrier and engaging the toothed portion of the feeler, a rack mounted independently of the feeler carrier and operatively engaged with the gear, and a spring normally holding the rack in rearward position and tending to turn the gear and feeler as they are moved frontwardly on a detecting beat.

3. In a feeler mechanism for looms, the combination of a feeler carrier, a feeler pivotally mounted on the carrier, an independently mounted rack yieldingly held in normal position, a gear connecting the rack and feeler constructed and arranged to cause frontward movement of the feeler by the lay on a detecting beat to effect frontward movement of the rack when the feeler is held from pivotal movement on a detecting beat and to effect pivotal movement of the feeler when the filling is substantially exhausted on a detecting beat.

4. In a feeler mechanism for looms, the combination of a feeler carrier mounted for movement toward and from the front of the loom, a feeler pivotally mounted on the carrier to swing in a direction longitudinally of the shuttle, a gear mounted on the feeler carrier and operatively connected with the feeler, and a rack which is mounted independent of the feeler carrier constructed and arranged to be moved frontwardly by the gear on a detecting beat when the feeler is prevented from pivotal movement by engagement with the filling and exerting a force through the gear to turn the feeler when the filling is substantially exhausted on a detecting beat.

5. In a feeler mechanism for looms, the combination of a feeler carrier, a feeler pivotally mounted thereon, a gear pivotally mounted on the carrier and engaging the feeler, a rack engaging the gear, and a spring normally acting on the rack and tending to turn the feeler as the latter is moved frontwardly on a detecting beat and effecting turning movement of the feeler when the filling is substantially exhausted.

6. In a feeler mechanism for looms, the combination of a feeler carrier, a feeler pivotally mounted thereon, a gear pivotally mounted on the carrier and engaging the feeler, a rack engaging the gear, a spring normally acting on the rack and tending to turn the feeler as the latter is moved frontwardly on a detecting beat and effecting turning movement of the feeler when the filling is substantially exhausted, and means for effecting replenishment of filling when the feeler is swung on its pivot on a detecting beat.

7. A feeler mechanism for looms, comprising in combination, a feeler carrier mounted for sliding movement toward and from the front of the loom, a feeler pivoted on the carrier, a rack which is yieldingly supported by the loom frame independent of the feeler carrier, and a gear mounted on the feeler carrier and operatively connecting the feeler and rack to effect swinging movement of the feeler by the rack due to the frontward movement of the feeler and gear relative to the rack on a detecting beat when the filling is substantially exhausted.

8. A feeler mechanism for looms, comprising in combination, a feeler carrier mounted for sliding movement toward and from the front of the loom, a feeler pivoted on the carrier, a rack which is yieldingly supported by the loom frame independent of the feeler carrier, a gear mounted on the feeler carrier and operatively connecting the feeler and rack to effect swinging movement of the feeler by the rack due to the frontward movement of the feeler and gear relative to the rack on a detecting beat when the filling is substantially exhausted, and means for limiting the relative movements of the feeler carrier and rack.

9. In a feeler mechanism for looms, a feeler stand, a feeler carrier and a rack carrier independently mounted on the feeler stand, a feeler mounted on the feeler carrier, and a gear connecting the feeler and rack carrier.

10. In a feeler mechanism for looms, the combination of a feeler carrier, a feeler mounted on the carrier for movement toward and from the front of the loom and also in a direction longitudinally of the shuttle, a rack which is mounted independently of the feeler carrier, a spring normally holding the rack in rearward position and operative connections between the rack and feeler constructed and arranged to cause the feeler to be moved longitudinally of the shuttle by the rack due to frontward pressure upon the feeler on a detecting beat when the filling is substantially exhausted.

11. In a feeler mechanism for looms, the combination of a feeler carrier mounted for movement toward and from the front of the loom, a feeler mounted on the carrier for movement in a direction longitudinally of the shuttle and held from such movement by engagement with the filling on a detecting beat until substantial exhaustion thereof, a gear for imparting lateral movement to the feeler, a rack for rotating the gear, spring means cooperating with the rack and tending to turn the gear and move the feeler longitudinally of the shuttle as the lay moves frontwardly on a detecting beat, and means for effecting replenishment of filling when the feeler is moved longitudinally of the shuttle.

12. In a feeler mechanism for looms, the combination of a feeler carrier mounted for movement towards and from the front of the loom, a feeler mounted on the carrier for movement in a direction longitudinally of the shuttle and held from such movement by engagement with the filling on a detecting beat until substantial exhaustion thereof, a gear having toothed engagement with the feeler, a rack mounted independently of the feeler carrier, spring means acting through the rack tending to turn the gear and move the feeler longitudinally of the shuttle as the lay moves frontwardly on a detecting beat, and means for effecting replenishment of filling when the feeler is moved longitudinally of the shuttle.

In testimony whereof, I have signed my name to this specification.

ISAAC SNOW.